United States Patent
Jakop

(10) Patent No.: US 10,434,453 B2
(45) Date of Patent: Oct. 8, 2019

(54) COMPRESSOR SYSTEM HAVING FILTER ASSEMBLY WITH REPLACEABLE FILTER ELEMENT HOLDER

(71) Applicant: Ingersoll-Rand Company, Davidson, NC (US)

(72) Inventor: Janez Jakop, Logatec (SI)

(73) Assignee: Ingersoll-Rand Company, Davidson, NC (US)

(*) Notice: Subject to any disclaimer, the term of this patent is extended or adjusted under 35 U.S.C. 154(b) by 522 days.

(21) Appl. No.: 14/962,427

(22) Filed: Dec. 8, 2015

(65) Prior Publication Data

US 2016/0184744 A1 Jun. 30, 2016

Related U.S. Application Data

(60) Provisional application No. 62/098,469, filed on Dec. 31, 2014.

(51) Int. Cl.
  *B01D 46/24* (2006.01)
  *B01D 46/00* (2006.01)

(52) U.S. Cl.
  CPC ..... *B01D 46/2414* (2013.01); *B01D 46/0005* (2013.01); *B01D 2265/06* (2013.01)

(58) Field of Classification Search
  CPC ............ B01D 46/0005; B01D 46/2411; B01D 46/2414; B01D 2265/06; B01D 2201/0415
  See application file for complete search history.

(56) References Cited

U.S. PATENT DOCUMENTS

| | | | |
|---|---|---|---|
| 3,260,367 A | 7/1966 | Hultgren | |
| 5,102,436 A | 4/1992 | Grabowski | |
| 5,183,488 A | 2/1993 | Deering | |
| 5,342,519 A | 8/1994 | Friedmann et al. | |
| 5,968,357 A | 10/1999 | Doelle et al. | |
| 6,152,979 A * | 11/2000 | Cappuyns | B01D 46/2411 55/385.3 |
| 6,436,162 B1 * | 8/2002 | Wake | B01D 35/30 55/498 |
| 6,569,329 B1 | 5/2003 | Nohren, Jr. | |
| 6,752,924 B2 | 6/2004 | Gustafson et al. | |
| 6,915,910 B2 | 7/2005 | Lutz et al. | |
| 6,936,084 B2 * | 8/2005 | Schlensker | B01D 46/0012 210/352 |
| 2004/0060439 A1 * | 4/2004 | Byrd | B01D 46/2411 95/273 |
| 2006/0065607 A1 | 3/2006 | Bassett et al. | |
| 2014/0290559 A1 | 10/2014 | Jakop | |
| 2017/0151521 A1 * | 6/2017 | Clarke | B01D 46/008 |

* cited by examiner

*Primary Examiner* — Robert Clemente
(74) *Attorney, Agent, or Firm* — Taft Stettinius & Hollister LLP

(57) ABSTRACT

A compressor system includes a compressor and a filter assembly that includes a holder and a replaceable filter element positioned via the holder. The holder is formed in part of a perforated wall such as a metallic mesh material wall, forming a cavity wherein the replaceable filter element is positioned. An end cap traps the replaceable filter element within the cavity. The holder is reusable, so as to reduce material waste and cost.

16 Claims, 4 Drawing Sheets

COMPRESSOR SYSTEM HAVING FILTER ASSEMBLY WITH REPLACEABLE FILTER ELEMENT HOLDER

TECHNICAL FIELD

The present disclosure relates generally to filter mechanisms used to filter fluid in compressor systems, and relates more particularly to a reusable filter element holder and replaceable filter element positioned via the holder.

BACKGROUND

Compressor systems are well-known and widely used throughout the world. Common applications include compressing working fluids such as air for performing work with pneumatically operated tools and the like. Other applications include compressing fluids for storage and transport. It is commonly desirable to filter fluid prior to working via a compressor, and after the fluid has been compressed. Filtering helps protect the integrity of components of the compressor and driven tools, as well as ensuring particulate contaminants are minimized in stored compressed fluids. In any case, filtration mechanisms will typically need to be periodically replaced. Reducing waste and cost in connection with compressor system filters remains an area of interest.

DETAILED DESCRIPTION OF ILLUSTRATIVE EMBODIMENTS

Figure 1:
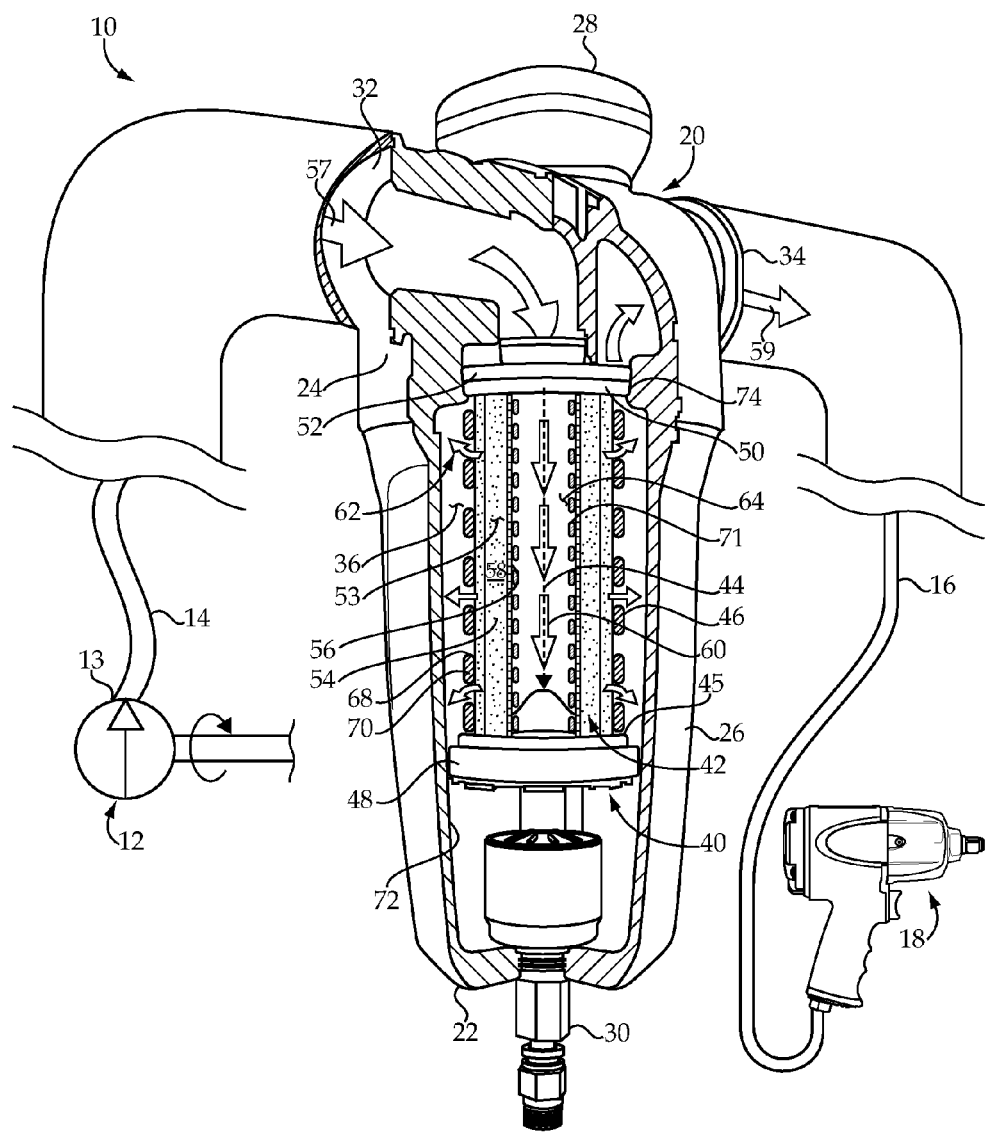
FIG. 1 is a partially sectioned diagrammatic view, in two section planes, of a compressor system according to one embodiment.

Referring to FIG. 1, there is shown a compressor system 10 according to one embodiment, and including a compressor 12 for compressing a fluid. The subject fluid might include a working fluid, for example air, compressed to store energy later released to move components in a tool or motor for performing mechanical work. The fluid could also include a gaseous fluid compressed and decompressed for temperature control purposes in the nature of air conditioning or a heat pump. In still other instances, the compressed fluid might include air compressed for storage in tanks to be used for breathing, compressed natural gas or other hydrocarbon gases reduced in volume and liquefied for storage or transport, or still other gaseous fluids and mixtures of gaseous fluids. In the illustrated embodiment, a conduit 14 is connected to compressor 12, and receives a feed stream of compressed fluid from a fluid outlet 13 of compressor 12. Conduit 14 conveys the fluid in a compressed state to a filter assembly 20 for filtering the fluid, and the fluid is thereafter conveyed through a conduit 16 and supplied to a pneumatic tool 18 or the like.

As noted above, the fluid compressed and filtered in accordance with the present disclosure might be used for a great many different purposes. Moreover, in addition to or rather than filtering fluid once worked by compressor 12, in other instances fluid might be filtered according to the present disclosure prior to being supplied to compressor 12, or potentially even filtered between sequential compressor stages. Those skilled in the art will be familiar with the general desirability of providing clean fluid such as air to a compressor rather than supplying fluid carrying particulate contaminants and the like. Those skilled in the art will further appreciate the general desirability of providing clean compressed fluid to a tool, or to a tank for storage. Certain components of filtration systems used in compressor systems to achieve such ends are periodically replaced, notably conventional cartridge filters. As will be further apparent from the following description, the present disclosure contemplates reduced waste of materials by virtue of eliminating or reducing the use of conventional cartridge filters.

Filter assembly 20 includes a housing 22 having an inlet 32 and an outlet 34 formed therein. An internal cavity 36 defined by an inner surface 72 of housing 22 is fluidly between inlet 32 and outlet 34. In a practical implementation strategy, housing 22 includes a first housing piece 24 and a second housing piece 26 coupled together in a generally known manner. First housing piece 24 includes a handle 28, and a liquid outlet 30 is formed in second housing piece 26 for conventional purposes. Instrumentation, a liquid drain, or still another mechanism can be conveyed or placed in fluid communication with cavity 36 by way of liquid outlet 30 if desired. It can thus be appreciated that liquid outlet 30 might be used for purposes in addition to or instead of draining liquid.

It can also be seen from FIG. 1 that inlet 32 receives incoming fluid generally in an incoming fluid flow direction defined by inlet 32 and shown via arrow 57. Outlet 34 defines an outgoing fluid flow direction shown via arrow 59. In the illustrated embodiment, the flow directions depicted via arrows 57 and 59 are substantially the same, although they need not be. Within filter assembly 20 fluid flow may turn, and in particular filter assembly 20 may define a transverse unfiltered fluid flow direction shown via arrows 60, and an opposite transverse filtered fluid flow direction. Arrows 62 depict fluid flow in a direction roughly normal to the transverse unfiltered fluid flow, and it will be appreciated that filtered fluid may transition in flow direction from that of arrows 62 to a more vertical direction toward outlet 34. A passage in housing 22, multiple passages, or clearance(s) (not shown) could fluidly connect cavity 36 to outlet 34. The terms unfiltered and filtered are used herein in a relative sense. It will thus be apparent that fluid enters filter assembly 20 in one direction, and then makes several turns before exiting in approximately the same direction it arrived. In other instances, the fluid flow patterns might differ from that illustrated without departing from the scope of the present disclosure.

A holder 40 is positioned within housing 22, and includes an elongate holder body 41. Holder body 41 is positioned at a location fluidly between inlet 32 and outlet 34, at least partially within cavity 36. A replaceable filter element 42 is positioned via holder 40 to filter fluid passed between inlet 32 and outlet 34. Holder 40 further defines a longitudinal center axis 44, and includes a perforated wall 46 extending longitudinally between a first axial end piece 48 and a second axial end piece 50. Perforated wall 46 may have a generally elongate cylindrical shape. First and second axial end pieces 48 and 50 may be understood to reside at first and second axial ends (not numbered) of body 41. In a practical implementation strategy, second axial end piece 50 is positioned upon or in contact with a shoulder 74 or the like, that locates holder 40 as desired within housing 22. Holder 40 could also be positioned by way of an interference fit, fasteners, or any other suitable mechanism.

A detachable end cap 52 may be coupled to second axial end piece 50. In the illustrated embodiment end cap 52 is considered part of holder 40. In other embodiments, an end cap is provided as a part of filter element 42. In any case, the various parts of end caps described in connection with the various embodiments can be interchanged with one another without limitation except as otherwise indicated. Perforated wall 46 further extends circumferentially around center axis 44 so as to define a cavity 53 extending between first and second axial end pieces 48 and 50. A second perforated wall 71 is within cavity 64, and configured similarly in form and composition to that of wall 46. Replaceable filter element 42 is trapped within cavity 53 via end cap 52, and includes a filter medium 54 of any suitable type such as paper, borosilicate, and other known materials. Filter medium 54 may have an upstream inner surface 56 exposed to unfiltered fluid incoming from inlet 32. Filter medium 54 further has a downstream outer surface 58 facing perforated wall 46 and exposed to filtered fluid outgoing to outlet 34. In a practical implementation strategy, inner surface 56 defines a flow passage 64 in fluid communication with inlet 32. Accordingly, it can be seen that fluid flows through inlet 32, and then turns down to flow through passage 64, and is then passed through filter medium 54, through perforated wall 46, and then through cavity 53 and up through outlet 34. In the illustrated embodiment, perforated wall 46 has an elongated cylindrical shape, and an unobstructed clearance 66, part of cavity 36, extends circumferentially around center axis 44 and radially between perforated wall 46 and housing 22.

Figure 2:
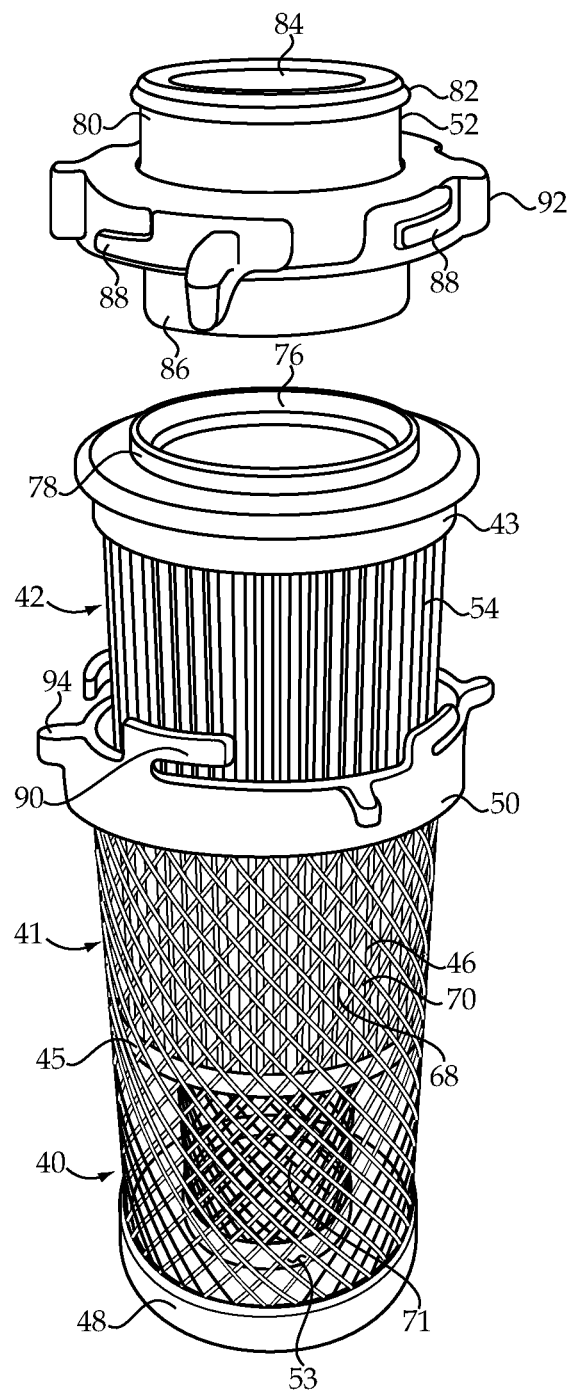
FIG. 2 is a perspective view of components of a filter assembly in a disassembled state, according to one embodiment.

Referring also now to FIG. 2, there is shown a view of holder 40 and filter element 42 partly disassembled from one another and removed from housing 22. Filter element 42 is shown as it might appear being inserted into body 41 of holder 40. It can be seen from FIG. 2 that filter medium 54 is attached to a first end ring 45, partly blocked from view by perforated wall 46 in FIG. 2, and a second end ring 43. Each of end "rings" 43 and 45 may be of generally annular or disc-like form, although the present disclosure is not thereby limited. Wall 71 may be attached to a disc 53 formed as an axially projecting part of end piece 48, such as by gluing. It will be recalled that filter medium 54 may define a flow passage 64, not visible in FIG. 2. End ring 43 may define an orifice 76 which fluidly connects with passage 64. Orifice 76 may further be formed in or partially in a stub tube 78 that projects in an axially outward direction, the significance of which will be further apparent from the following description. Also shown in FIG. 2 is end cap 52 decoupled from body 41. End cap 52 may include a fitting 80 that projects in an axially outward direction, and also a stub tube 86 that projects in an axially inward direction. Each of end cap 52, filter element 42 and holder body 41 are arranged coaxially in a practical implementation strategy. A sealing element 82 may be positioned upon fitting 80, such that sealing element 82 forms a fluid seal with housing 22. In a practical implementation strategy, sealing element 82 is a conventional O-ring, and can be seated in a groove (not shown) about fitting 80, retained by way of a protruding lip on fitting 80, or positioned upon fitting 80 by way of any other suitable strategy including friction alone. It should also be appreciated that while fitting 80 is illustrated as received within a complementary structure in housing 22, an alternative configuration could include a part of housing 22 that is received within fitting 80, or any of a variety of other constructions. End cap 52 may further define a through-bore 84 that extends through fitting 80 and also through stub tube 86, such that fluid communication is established with fluid passage 64 extending through filter element 42.

It can also be seen from FIG. 2 that perforated wall 46 may have perforations which together have an area greater than an area of wall material 70. Wall 71 is similarly configured. As used herein, references to area should be understood as a macroscopic cross-sectional area, hence a fluid flow area provided by perforations 68 is greater than the obstructed area provided by wall material 70. It can also be seen from FIG. 2 that perforated wall 46 has the form of a mesh or screen, which may be metallic, and may further be formed by a plurality of wires. In other embodiments, rather than a wire mesh or the like perforations might be cut in a solid metal or other material tube. In a practical implementation strategy, perforated wall 46 is formed entirely, or substantially entirely, of stainless steel and is a structural element of holder 40. First and second axial end pieces 48 and 50 may be formed of a suitable plastic material.

Figure 3:
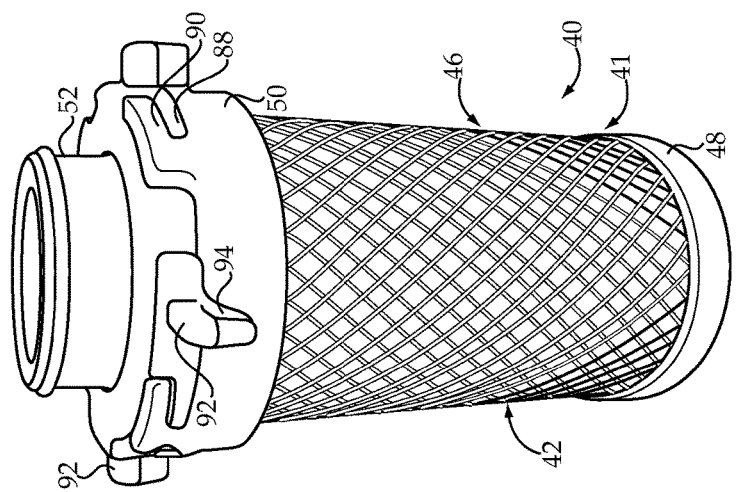
FIG. 3 is a perspective view of components of the filter assembly of FIG. 2 in an assembled state.

As discussed above, filter element 42 may be trapped within cavity 53, and will typically be trapped in cavity 53 by way of coupling end cap 52 with second axial end piece 50. To this end, end piece 50 may include a locking element 90, whereas end cap 52 may include a locking element 88. In the illustrated embodiment, locking elements 88 and 90 are complementary, and in the nature of a well-known bayonet connection or the like. In other instances, an interference or snap-fit connection, or a threaded connection with internal or external threads on end cap 52 and the other of internal or external threads on end piece 50 could be used. Referring also now to FIG. 3, there is shown holder 40 with filter element 42 assembled therewith. Filter element 42 is shown positioned entirely within holder 40, and may be located within holder 40 by way of an interaction between stub tube 86 and stub tube 78, and fitted coaxially about wall 71 as well. End piece 48 blocks one end of cavity 53, a blind cavity end, whereas an opposite end of cavity 53, an open cavity end, is open via an opening 95 in end piece 50 although of course partially blocked by end cap 52 when coupled therewith. Through-bore 84 is in fluid communication with orifice 76, or alternatively could extend all the way through orifice 76 by virtue of stub tube 86 being made longer, such that compressed fluid flow through through-bore 84 will pass into the center passage 64 defined by filter medium 54, and then particulates removed as the compressed fluid passes through filter medium 54 and ultimately out of filter assembly 22 altogether. Locking element 88 is engaged with locking element 90, and tabs 92 on end cap 52 and also tabs 94 on end piece 50 have been circumferentially aligned via twisting end cap 52 relative to end piece 50. It will also be noted from FIG. 3 that twisting of end cap 52 relative to body 41, and alignment of tabs 92 and 94, can provide a positive and readily observable locating feature whereby a user determines that holder 40 is appropriately assembled. It will further be appreciated that assembly of holder 40 with filter element 41 might occur while holder 40 is within housing 22, but can also be carried out by removing holder 40 from housing 22.

Figure 4:
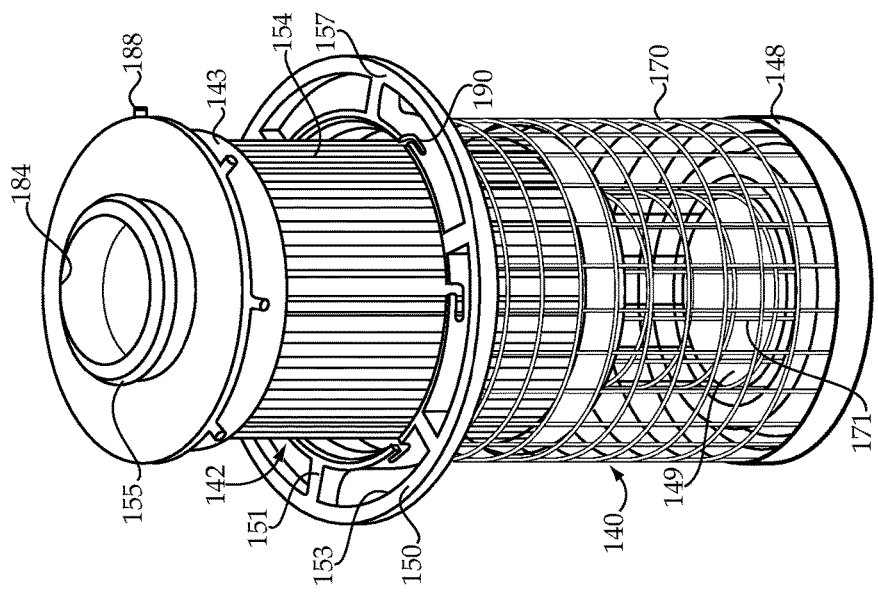
FIG. 4 is a perspective view of components of a filter assembly in a disassembled state, according to another embodiment.

Referring now to FIG. 4, there is shown a holder 140 and filter element 142, according to one embodiment, and as they might appear partially assembled. Holder 140 and filter element 142 have features and parts with certain similarities to the foregoing embodiments, but also certain differences. Holder 140 includes an end piece 148, an opposite end piece 150, and an outer perforated wall or mesh 170 extending between first and second end pieces 148 and 150. Holder 140 also includes an inner perforated wall or mesh 171 which may be coupled to a disc 149 or the like attached to or part of end piece 148, such as by gluing. End piece 150 differs from that of foregoing embodiments, and includes an outer ring 157 coupled with or attached to a plurality of radially extending ribs 151. A plurality of apertures 153 are spaced circumferentially about end piece 150, and defined in part by outer ring 157 and in part by ribs 151.

Figure 5:
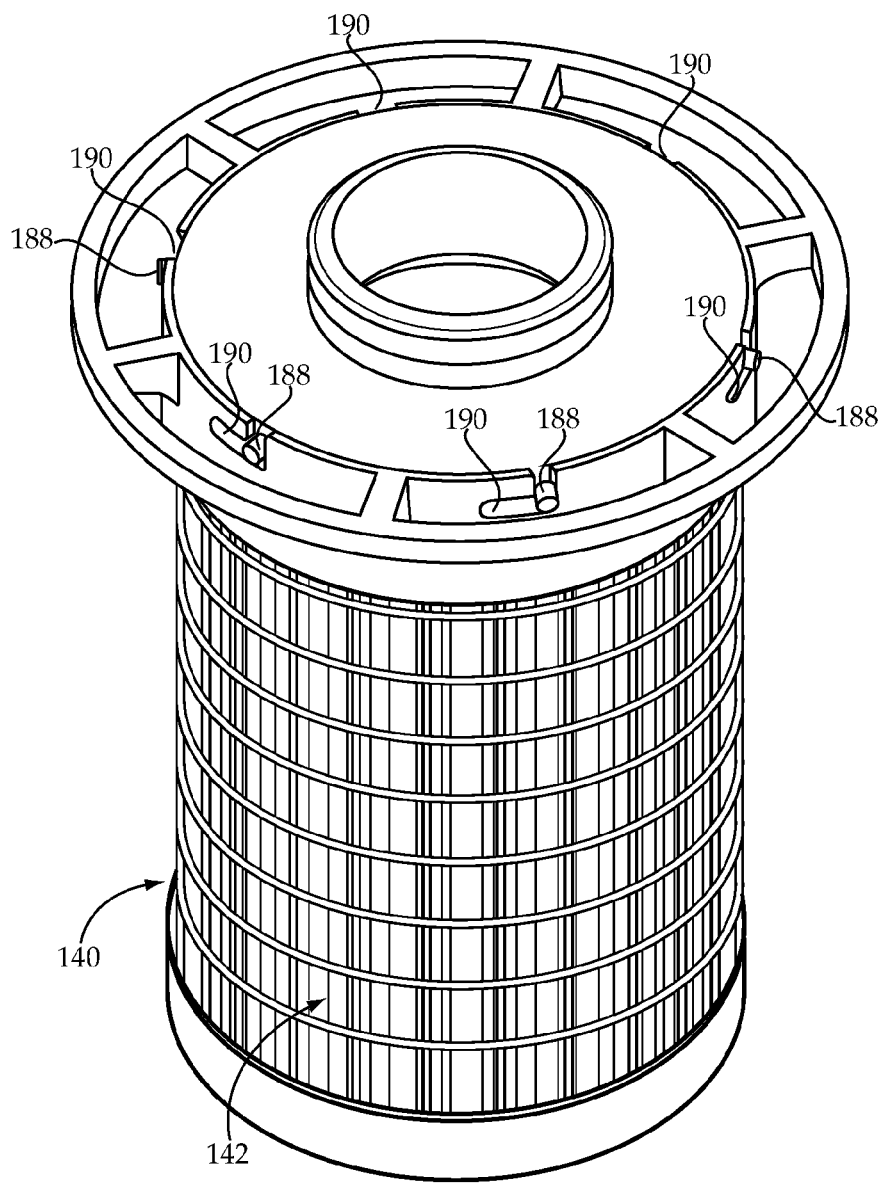
FIG. 5 is a perspective view of components of the filter assembly of FIG. 4 in an assembled state.

Referring also to FIG. 5, illustrating filter element 142 coupled with holder 140, filter element 142 differs from previous embodiments in that a locking mechanism is formed in part on filter element 142, and in part on holder 140, rather than using a separate detachable end cap. In the illustrated embodiment, filter element 142 includes end cap 143, which includes locking elements 188 projecting in a radially outward direction. A through-bore 184 extends axially through piece 143, and an O-ring 155 is positioned upon piece 143, extending circumferentially about aperture 184. End cap 143 may be reversibly coupled to end piece 150, and irreversibly coupled to filter element 154. A plurality of locking elements 188, illustrated in the form of protruding stubs or the like, are positioned upon end cap 143. Another plurality of locking elements 190 having the general form of L-shaped slots are formed in end piece 150. In a practical implementation strategy, locking elements 188 and 190 may form a bayonet coupling generally analogous to the bayonet coupling described in connection with earlier embodiments. It should be appreciated, however, that any of a variety of other coupling mechanisms could be used. It can be seen from FIG. 5 that filter element 142 can be slid axially into holder 140, and then rotated a relatively modest amount, typically about 2° to about 10°, to engage the bayonet coupling and position filter element 142 for service. Then, the assembly of filter element 142 and holder 140 can be installed in a filter housing in a manner generally analogous to that of the other embodiments discussed and described herein.

Those skilled in the art will be familiar with known cartridge filter designs where components that perform locating and structural functions, as opposed to the filtering function, are irreversibly attached to one another and parts of a single component. For instance, with many cartridge filters a frame or the like which positions and locates the cartridge filter within a filter housing is formed integrally with or irreversibly attached to filter media such as by gluing. For this reason, the entire unit of the frame and filter medium are discarded every time a filter is changed. According to the present disclosure, the relatively inexpensive, and easily replaced filter media can be readily swapped out once its useful service life has ended or performance begins to degrade, reducing material waste and reducing the cost of equipment servicing.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims.

What is claimed is:
1. A compressor system comprising:
a compressor for compressing a fluid;
a filter assembly for filtering the fluid, and including a housing having an inlet and an outlet formed therein, a holder within the housing, and a replaceable filter element positioned via the holder to filter fluid passed between the inlet and the outlet;
the holder defining a longitudinal center axis, and including a perforated wall extending longitudinally between a first axial end piece and a second axial end piece, and the perforated wall further extending circumferentially around the center axis so as to define a cavity extending between the first and second axial end pieces, the second axial end piece having an exterior periphery and which is coupled to an outer ring that extends around and is offset from the exterior periphery;
an end cap detachably coupled to the second axial end piece; and
the replaceable filter element being trapped within the cavity via a mechanical rotation of the end cap relative to the second axial end piece, and including a filter medium having an upstream inner surface exposed to a flow of fluid from the inlet, and a downstream outer surface facing the perforated wall and exposed to a flow of fluid to the outlet;
wherein the end cap includes a plurality of first bayonet projections configured to extend in a circumferential direction, and the second axial end piece includes a plurality of second bayonet projections forming an opening with a body of the second axial end piece, the opening sized to receive the first bayonet projections of the end cap.

2. The system of claim 1 wherein the perforated wall has an elongated cylindrical shape, and a clearance extends circumferentially around the center axis and radially between the perforated wall and the housing.

3. The system of claim 2 wherein the perforated wall is formed of a metallic material.

4. The system of claim 3 wherein the metallic material includes a metallic mesh material.

5. The system of claim 2 wherein the filter medium has an elongated cylindrical shape and each of the inner filter surface and the outer filter surface extends circumferentially around the longitudinal center axis.

6. The system of claim 1 wherein the end cap includes a fitting, and a sealing element is positioned between the fitting and the housing so as to form a fluid seal.

7. The system of claim 6 wherein the fitting extends in an axially outward direction, and the end cap further includes a stub tube extending in an axially inward direction and received within the replaceable filter element.

8. The system of claim 1 wherein the compressor includes a fluid outlet, and the inlet of the filter assembly is in fluid communication with the fluid outlet of the compressor.

9. The system of claim 8 wherein the inlet defines an incoming fluid flow direction, and the filter assembly defines a transverse unfiltered fluid flow direction and an opposite transverse filtered fluid flow direction.

10. A filter assembly comprising:
a housing having an inlet and an outlet formed therein;
a holder positioned within the housing at a location fluidly between the inlet and the outlet and defining a longitudinal center axis, and the holder including a perforated wall extending longitudinally between a first axial end piece and a second axial end piece, the second axial end piece including a first radially extending tab formed on an outer surface of the second axial end piece;

the perforated wall further extending circumferentially around the center axis so as to define an elongate cavity extending between a blind cavity end formed by the first axial end piece and an open cavity end formed by the second axial end piece;

an end cap coupled with the second axial end piece so as to partially block the open cavity end, the end cap including a second radially extending tab formed on an outer surface of the end cap; and a replaceable filter element trapped within the elongate cavity via a mechanical coupling of the end cap with the second axial end piece at a circumferential location offset from the longitudinal center axis such that the open cavity is formed between the circumferential location and the longitudinal center axis, and including a filter medium having an upstream inner surface exposed to a fluid flow from the inlet, and a downstream outer surface facing the perforated wall and exposed to a fluid flow to the outlet;

wherein alignment of the first radially extending tab and the second radially extending tab provides an assembly indication that the end cap is positively coupled with the second axial end piece;

wherein the inner surface of the filter medium defines a fluid flow passage, and the end cap further includes a fitting fluidly connecting the fluid flow passage to the inlet;

wherein the end cap further includes a first locking element and the second axial end piece includes a complementary locking element; and wherein the end cap is reversibly coupled to the second axial end piece, and the end cap is irreversibly coupled to the replaceable filter element.

11. The assembly of claim 10 wherein the filter medium has an elongate cylindrical shape and each of the inner filter surface and the outer filter surface extends circumferentially around the longitudinal center axis, and wherein the end cap includes a first stub tube and the filter element includes a second stub tube coaxially fitted with the first stub tube.

12. The assembly of claim 10 wherein the perforated wall is formed of a metallic mesh material.

13. A holder for a replaceable filter element in a compressor system comprising:

an elongate body defining a longitudinal center axis extending between a first axial body end and a second axial body end, and including a first axial end piece at the first axial body end, a second axial end piece at the second axial body end, and a perforated wall, the elongate body further including an outer ring connected to the second axial end piece via a plurality of ribs;

the perforated wall including perforations that are together greater in area than an area of material forming the perforated wall, and the perforated wall extending longitudinally between the first and second axial end pieces and circumferentially around the center axis so as to define an elongate cavity;

the first axial end piece blocking the cavity at the first axial body end, and the second axial end piece having an opening formed therein so that the cavity is open at the second axial body end; and a detachable end cap adapted to be coupled to the elongate body at the second axial body end via a circumferential mechanical rotation so as to trap a replaceable filter element within the cavity and discourage axial disassembly of the detachable end cap from the second axial body end, and the detachable end cap further defining an axially extending through-bore for fluidly connecting an inlet in a filter housing with the replaceable filter element within the cavity;

wherein the end cap includes a plurality of first projections configured to extend in a circumferential direction, and the second axial end piece includes a plurality of second projections at an axial end of the second axial end piece, the plurality of second projections forming an opening with a body of the second axial end piece, the opening sized to receive the first projections of the end cap.

14. The holder of claim 13 wherein the detachable end cap further includes a fitting, and a sealing element positioned upon the fitting for forming a fluid seal with the filter housing.

15. The holder of claim 13 wherein the detachable end cap has a stub tube opposite the fitting, and the through-bore extends through each of the fitting and the stub tube.

16. The holder of claim 15 wherein the perforated wall is formed of a metallic mesh material.

* * * * *